United States Patent
Rambo

(10) Patent No.: US 6,994,366 B2
(45) Date of Patent: Feb. 7, 2006

(54) FLUSH MOUNT FORK TUBE CAP NUT FOR THE TRIPLE OF A MOTORCYCLE

(76) Inventor: Peter G. Rambo, 1124 Old Douglass Rd., Winnsboro, SC (US) 29160

( * ) Notice: Subject to any disclaimer, the term of this patent is extended or adjusted under 35 U.S.C. 154(b) by 0 days.

(21) Appl. No.: 10/873,004

(22) Filed: Jun. 22, 2004

(65) Prior Publication Data
US 2005/0280243 A1 Dec. 22, 2005

(51) Int. Cl.
B62K 21/22 (2006.01)

(52) U.S. Cl. .............. 280/279; 280/276; 280/280

(58) Field of Classification Search ......... 280/279, 280/276; D12/197; 220/288, 249; 411/180, 411/402, 910, 378, 372.5, 399
See application file for complete search history.

(56) References Cited

U.S. PATENT DOCUMENTS

| | | | |
|---|---|---|---|
| 4,057,264 A * | 11/1977 | Suzuki et al. ............ 280/276 |
| 4,327,928 A * | 5/1982 | Chalmers ................ 280/277 |
| 4,561,669 A * | 12/1985 | Simons ................... 280/276 |
| 4,682,520 A * | 7/1987 | Gray ...................... 81/471 |
| 5,301,973 A * | 4/1994 | Truchinski ............... 280/276 |
| D374,730 S | 10/1996 | Hauser |
| D400,838 S * | 11/1998 | Stahel .................... D12/197 |
| 5,947,498 A * | 9/1999 | Rajaee ................... 280/276 |
| 5,967,538 A * | 10/1999 | Callaluca et al. ......... 280/279 |
| 6,155,370 A | 12/2000 | Iwai et al. |
| 6,164,675 A | 12/2000 | Pickering |
| 6,176,503 B1 | 1/2001 | George |
| 6,209,745 B1 | 4/2001 | Jansson |
| 6,712,541 B1 * | 3/2004 | Henricksen ............... 403/344 |
| 6,843,493 B2 * | 1/2005 | Buckhouse et al. ......... 280/279 |
| 2003/0006083 A1 | 1/2003 | Strader et al. |
| 2005/0023795 A1 * | 2/2005 | Czysz .................... 280/276 |

* cited by examiner

Primary Examiner—Tony H. Winner
(74) Attorney, Agent, or Firm—Sara A. Centioni; Nexsen Pruet, LLC

(57) ABSTRACT

A flush mount fork tube cap nut for a triple tree of a motorcycle, having a cap nut that is threadedly engaged to the end of the fork tubes of a triple tree of a motorcycle steering assembly so that the top of the cap nut is flush with the top of the triple tree.

6 Claims, 2 Drawing Sheets

FLUSH MOUNT FORK TUBE CAP NUT FOR THE TRIPLE OF A MOTORCYCLE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING, A TABLE, OR A COMPUTER PROGRAM LISTING COMPACT DISK APPENDIX

Not Applicable.

BACKGROUND OF THE INVENTION

This invention relates generally to flush mounts for motorcycles, and, more particularly, to a flush mount fork tube cap nut for the triple tree of a motorcycle.

The prior art nut-type assembly is screwed into a hollow fork tube by using a wrench or equivalent tool to rotate the raised nut and thereby engage the threaded element of the prior art nut-type assembly with the threaded interior of the hollow fork tube. Once the prior art nut-type assembly is tightly engaged with the hollow fork tube, the fork tube slides into the cavity of the triple tree and the entire assembly is then held in place by means of a pinch bolt or similar structure.

The nut of the prior art nut-type assembly sits in a raised position from the upper plane of the triple tree. By being raised from the top plane of the triple tree, the aerodynamic aesthetic of the smooth top plane of the triple tree is lessened. There also exists a risk of items such as clothing and hair becoming tangled with the raised mount assembly.

The raised mount assembly of the prior art also increases wind resistance of the motorcycle, thereby adversely affecting fuel economy and being detrimental to precise handling of the motorcycle at high speeds.

Accordingly, there exists a need for a flush mount for the triple tree of a motorcycle.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

According to its major aspects and briefly stated, the present invention is a flush mount fork tube cap nut for a triple tree of a motorcycle.

An advantage of the present invention is that it presents a smooth surface flush with the top of the triple tree of a motorcycle. By not extending above the surface of the triple tree, the present invention maintains the aerodynamic aesthetic of the smooth triple tree, eliminates the possibility of clothing, hair, or other items becoming entangled, and decreases the wind resistance caused by the prior art raised nut-type assembly.

Another feature of the present invention is reduction in wind resistance offered by the smooth surface of the cap nut for use in a triple tree flush mount.

Another feature of the present invention is the availability of a smooth metallic surface on which a custom design may be ball-milled, etched or otherwise decorated.

Yet another feature of the present invention is the use of the flush mount in varying sizes so as to fit both American and import models of motorcycles currently equipped with prior art cap nuts.

Other features and advantages of the present invention will be apparent to those skilled in the art from a careful reading of the Detailed Description of the Preferred Embodiments presented below and accompanied by the drawings.

DETAILED DESCRIPTION OF THE PREFERRED EMBODIMENTS

Figure 1:
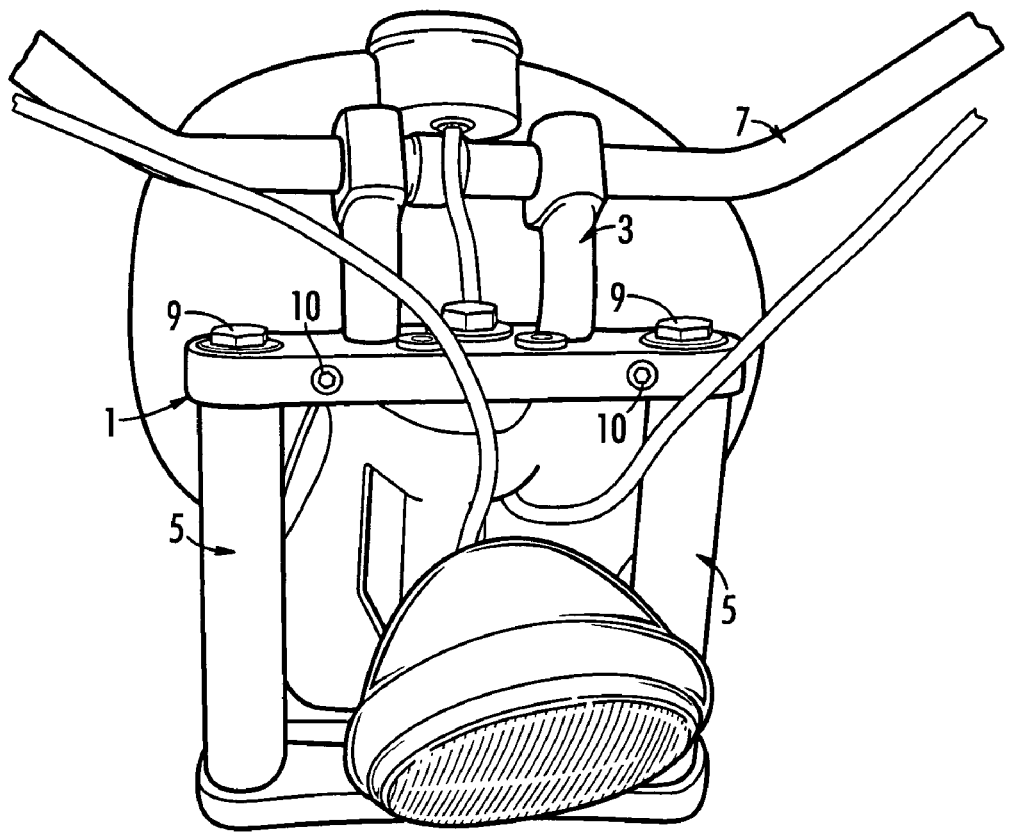
FIG. 1 is a perspective front view showing a prior art triple tree with a nut.

The present invention is a flush mount fork tube cap nut for the triple tree of a motorcycle. As illustrated in FIG. 1, the triple tree 1 of a motorcycle interconnects a steering column 3 or tube and hollow fork tubes 5. A handlebar assembly 7 is attached to the steering column 3. By turning the handlebar assembly 7, rotation is transferred to the triple tree 1 and the fork tubes 5. The fork tubes 5 are fixedly attached to the front wheel of the motorcycle and facilitate steering.

Figure 2:
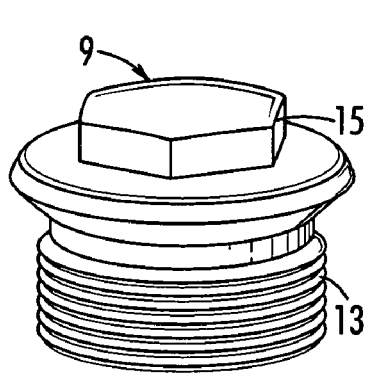
FIG. 2 is a perspective view of a prior art cap nut.
Figure 3:
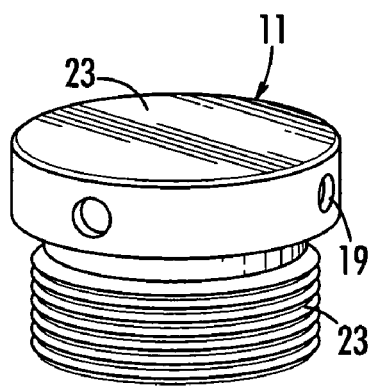
FIG. 3 is a perspective view of a flush mount fork tube cap nut for a triple tree of a motorcycle according to a preferred embodiment of the present invention.

The hollow fork tubes 5 are capped with a cap nut 9. Cap nuts are generally manufactured with a raised nut-type assembly 15 as shown in FIGS. 1 and 2. The preferred embodiment of the present invention utilizes a smooth cap nut 11, as illustrated in FIGS. 3, 4A, 4B and 5.

The difference between the prior art cap nut assembly (FIGS. 1 and 2) and the present invention (FIGS. 3 and 4) is readily apparent. The prior art cap nut 9 comprises a threaded assembly 13 that engages a similarly threaded assembly in the hollow interior of the fork tube 5. By tightening the nut 15 on the cap nut assembly 9, the threads interleave and frictionally secure the fork tube 5 to the cap nut assembly 9. The fork tube 5 and the fixedly attached cap nut assembly 9 are held in place in the triple tree 1 by way of a pinch bolt 10 which, when tightened, frictionally secures the fork tube 5 and the cap nut assembly 9 to the triple tree 1.

The present flush mount fork tube cap nut 11 is preferably made of metal. In an optional embodiment, the present flush mount fork tube cap nut 11 could also be of a nonmetallic composition. The present flush mount fork tube cap nut 11 has a smooth upper surface 23 and further comprises a threaded assembly 21 that engages a similarly threaded assembly in the hollow interior of the fork tube 5. The present fork tube cap nut 11 is tightened by way of engaging a spanner wrench or equivalent tool with the milled holes 19 in the present fork tube cap nut 11. Other embodiments of the present fork tube cap nut 11 comprise knurled or milled edges to facilitate hand-tightening of the present fork tube cap nut 11 instead of using a spanner wrench and the milled holes 19. Other means of fastening the flush mount fork tube cap 11 to the triple tree 1 are apparent to those skilled in the art.

Figure 4A:
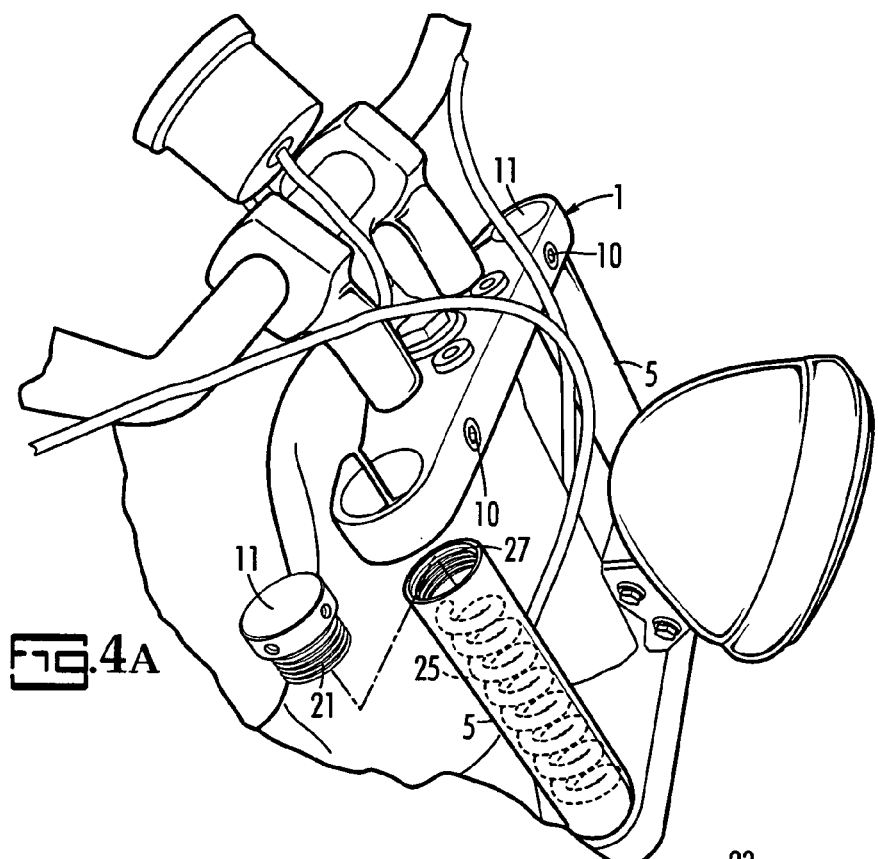
FIG. 4A is a perspective view of a cap nut according to a preferred embodiment of the present invention prior to installation.

As illustrated in FIG. 4A, the threaded assembly 21 of the flush mount fork tube cap 11 engages a similarly threaded assembly in the top interior of the fork tube 27. By tightening the threaded assemblies, the threads interconnect and secure the fork tube 5 to the flush mount fork tube cap 11. The hollow interior of the fork tube 5 may contain springs 25 or other apparatus that are part of the hydraulic shock absorbing system of the motorcycle.

Figure 4B:
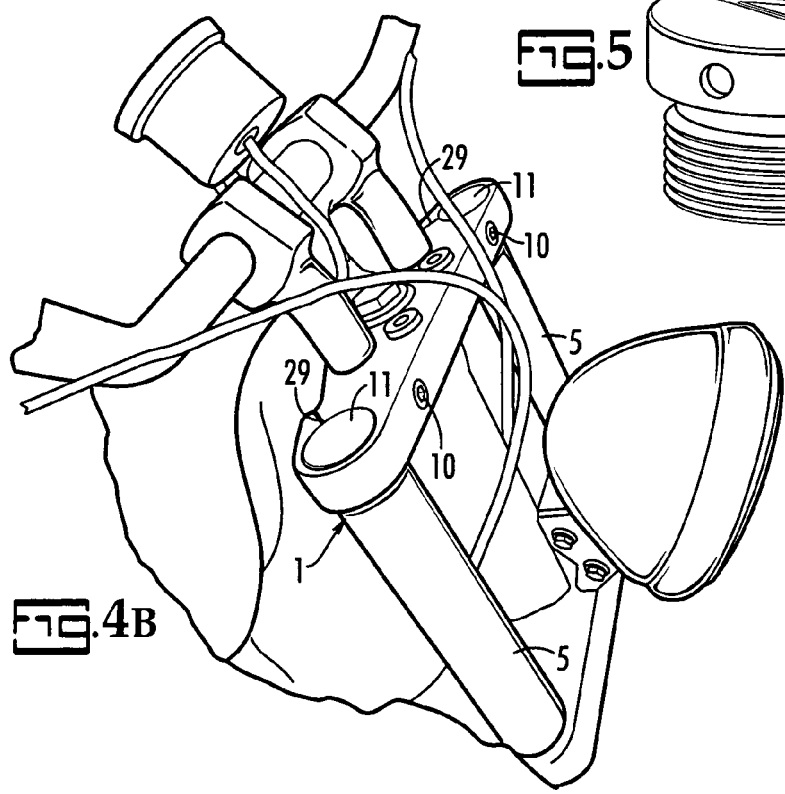
FIG. 4B is a perspective view of a cap nut according to a preferred embodiment of the present invention.

The flush mount fork tube cap nut 11 and the fixedly attached fork tube 5 are then slid through the receiving cavity of the triple tree 1 until the smooth upper surface 23 of the present flush mount fork tube cap nut 11 is flush with the top plane of the triple tree 1, as illustrated in FIG. 4B. The pinch bolt 10 is then tightened, which closes a gap 29 in the triple tree 1 such that the flush mount fork tube cap nut 11 and the fixedly attached fork tube 5 are frictionally held in place.

Figure 5:
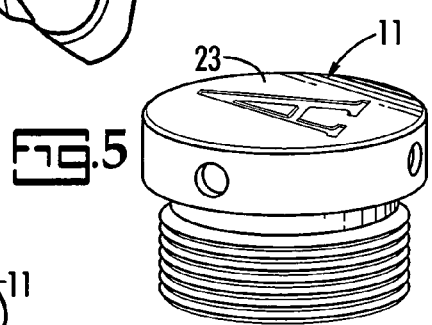
FIG. 5 is a perspective view of a alternate embodiment of the cap nut.

As illustrated in FIG. 5, the smooth upper surface 23 of the present flush mount fork tube cap nut 11 may be decorated with a design to add aesthetic value to the motorcycle.

Finally, there are many alternative embodiments and modifications of the present invention that are intended to be included within the spirit and scope of the following claims.

What is claimed is:

1. A flush mount fork tube cap nut for a triple tree of a motorcycle, comprising:
   a triple tree having a top and including fork tubes; and
   a cap nut having a top, wherein said cap nut is threadedly engaged to said fork tubes of said triple tree so that said top of said cap nut is flush with said top of said triple tree.

2. The flush mount fork tube cap nut as recited in claim 1, wherein said flush mount fork tube cap nut is metal.

3. The flush mount fork tube cap nut as recited in claim 1, wherein said flush mount fork tube cap nut is a nonmetallic composition.

4. The flush mount fork tube cap nut as recited in claim 1, wherein said flush mount fork tube cap nut is adapted to be installed using a spanner wrench.

5. The flush mount as recited in claim 1, wherein said flush mount fork tube cap nut carries a design.

6. The flush mount as recited in claim 1, wherein said flush mount fork tube cap nut has knurled or milled edges.

\* \* \* \* \*